Nov. 17, 1959 D. NUDELL 2,912,785
COMBINED MINNOW BUCKET AND MINNOW TRAP
Filed June 16, 1958 2 Sheets-Sheet 2
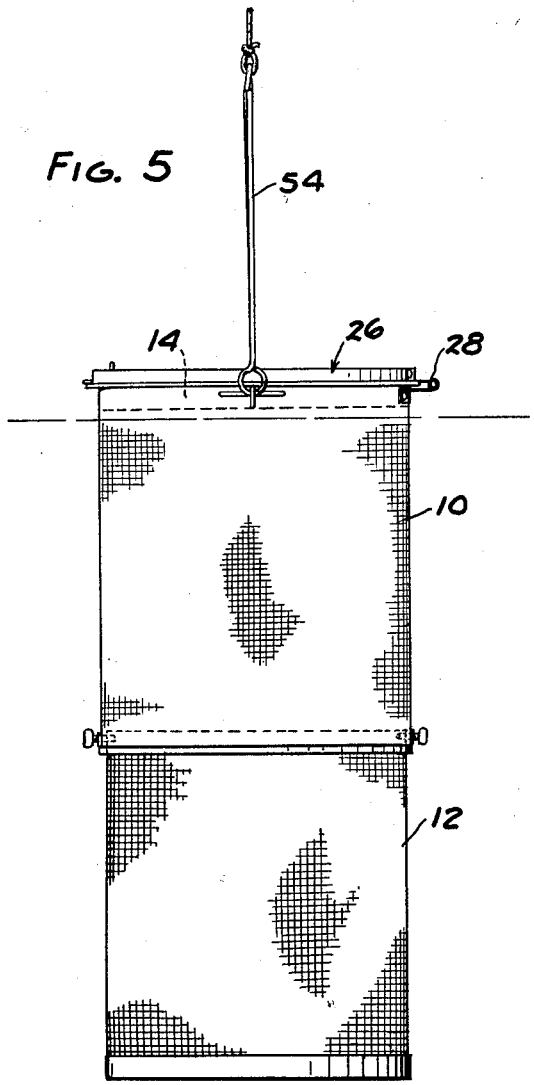
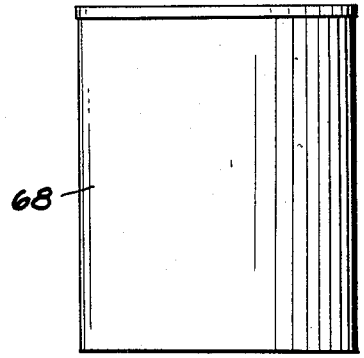
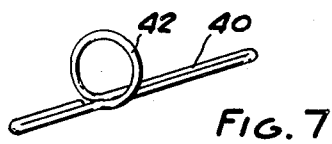
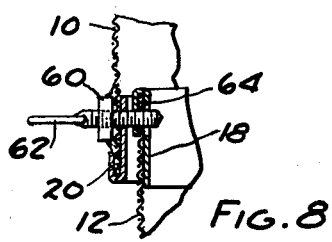
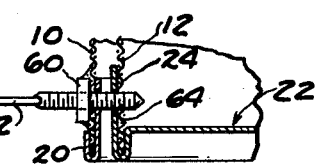
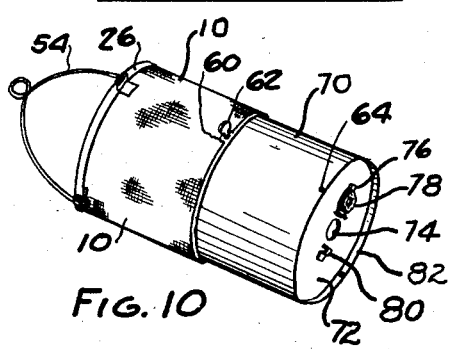
INVENTOR.
DEWEY NUDELL
BY
ATTORNEYS

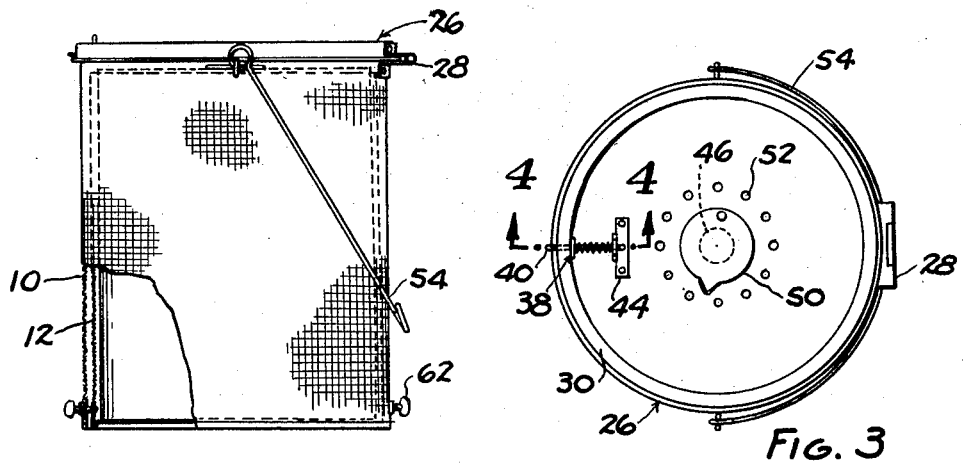
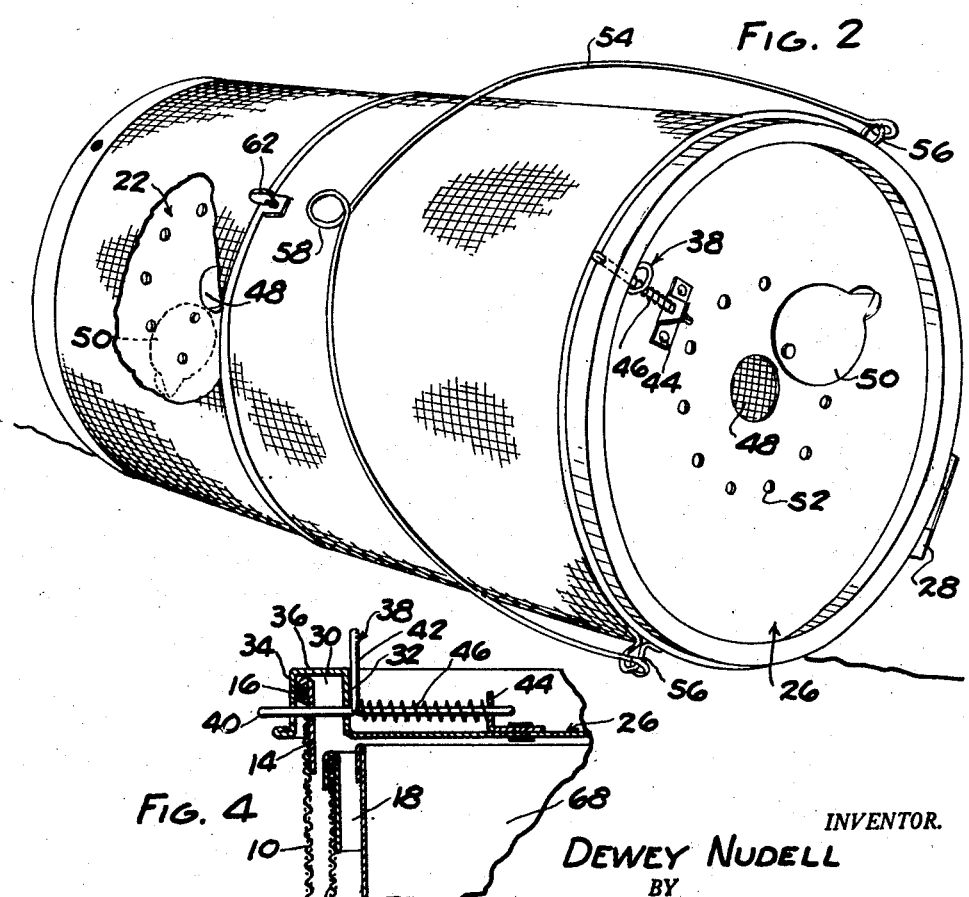

United States Patent Office 2,912,785
Patented Nov. 17, 1959

2,912,785

COMBINED MINNOW BUCKET AND MINNOW TRAP

Dewey Nudell, Flint, Mich.

Application June 16, 1958, Serial No. 742,126

2 Claims. (Cl. 43—56)

This invention relates to a combined minnow bucket and minnow trap.

It is customary for fishermen who use minnows for bait to include in their equipment both a minnow bucket and a minnow trap. The inclusion of both of these items in the fishermen's equipment represents a needless expense and usually multiplies the space occupied by the equipment than would be the case if either one or the other of these items were eliminated.

The general object of the present invention is to provide a container device so constructed that it is admirably suited for use both as a minnow bucket and as a minnow trap. In addition, the device of the present invention is so constructed that the device as a whole occupies no more space than the conventional minnow bucket.

The device of the present invention generally consists of a pair of telescoping tubular sections formed of a foraminous material, one end of the device being closed by a bottom wall and the other end being closed by a hinged cover. The bottom wall and the cover are each provided with a relatively small aperture which serves as an inlet for minnows. The two tubular sections are arranged so that they can be fully extended or fully collapsed. The device also includes a bucket member which is adapted to be removably arranged within the telescoping tubular sections when the latter are collapsed so that the device can serve as a container for holding a quantity of minnows and water. Various other features of the invention relate to details of construction which render the device sturdy, simple in operation and economical in cost.

In the drawings:

Fig. 1 is a side elevational view, partly in section, of the combined minnow bucket and trap of the present invention.

Fig. 2 is a perspective view of the device when extended and used as a minnow trap.

Fig. 3 is a top plan view of the device.

Fig. 4 is a sectional view along the lines 4—4 in Fig. 3.

Fig. 5 is a side elevational view of the device in the extended condition when utilized for storing minnows.

Fig. 6 is a side elevational view of the bucket member of the device.

Fig. 7 is a perspective view of the latch member for the cover.

Fig. 8 is a fragmentary sectional view of the device when in the condition illustrated in Fig. 5.

Fig. 9 is a fragmentary sectional view of the device when in the condition illustrated in Fig. 1.

Fig. 10 is a perspective view of a modified form of the invention.

The combined minnow bucket and trap of the present invention generally comprises a pair of telescopically arranged outer and inner members 10 and 12, respectively, that are of cylindrical shape. The side walls of these members are formed of a foraminous material such as a self-supporting wire mesh. The diameter of the inner member 12 is slightly less than the diameter of the outer member 10. The inner member 12 is slightly shorter in height than the outer member 10 so that when these members are fully collapsed (Figs. 1, 4 and 9), the upper edge of the inner member 12 is spaced below the upper edge of the outer member 10. Around the upper edge of the outer member 10, there is provided a reinforcing rim 14. The rim 14 is in the form of a sheet metal annulus arranged within the member 10 and has its upper end flanged over the upper peripheral edge of member 10 as at 16. The upper end of the inner member 12 is similarly reinforced by a sheet metal rim 18. Likewise, the lower edge of the outer member 10 is reinforced by a sheet metal rim 20. To the lower end of the inner member 12, there is secured a bottom wall 22. The peripheral edge of wall 22 is flanged as illustrated to form a reinforcing rim 24 for the lower peripheral edge of inner member 12.

A cover 26 is provided for closing the upper end of the outer member 10. Cover 26 is pivotally secured to the upper end of the outer member 10 by a hinge 28, one leg of which is riveted to the reinforcing rim 14 (Fig. 5).

Referring more particularly to Figs. 3 and 4, it will be observed that the periphery of cover 26 is formed into an inverted U-shaped channel 30 having inner and outer walls 32 and 34, respectively, and a top wall 36. In the closed position of the cover, the upper end of the outer member 10 is received within the channel 30. At a point generally diametrically opposite from hinge 28, the walls 32, 34 of channel 30 and the rim 14 are provided with registering openings, as illustrated, to receive the end of the bolt-type latch member 38. Latch 38 includes a shank portion 40 having a finger engaging ring 42 intermediate its ends. Shank 40 has one end thereof slidably retained by a bracket 44 riveted to cover 26 and a coil spring 46 is arranged around shank 40 between bracket 44 and ring 42 so that the outer end of the shank is normally projected through the registering apertures in the side walls 32, 34 of channel 30.

Cover 26 and bottom wall 22 are each provided with a relatively small central aperture 48 which forms a minnow inlet when the device is used as a minnow trap. Discs 50 are riveted to the bottom wall 22 and the cover 26 so that they can be pivoted from a position overlying the openings 48 to a position wherein the openings 48 are exposed. Preferably, the bottom wall 22 and the cover 26 are also provided with a series of very small openings 52 extending around the central openings 48. A bail 54 has its opposite ends secured to rings 56 which are welded to the top rim 14 of the outer member 10. Bail 54 is twisted into a loop 58 to facilitate tying a rope around the bail.

In Figs. 8 and 9 are illustrated the details of the means for holding the inner and outer sections in either the extended or the collapsed position. These means include a pair of nuts 60 welded through the mesh material to the rim 20 at the lower end of the outer member 10. A wing screw 62 is threaded into each nut. Rim 18 at the upper end of inner member 12 is provided with apertures 64 registering with screws 62 so that when the inner and outer members are fully extended, the screws 62 can be advanced through the nuts 60 to project the inner ends of the screws through the openings 64 and thus retain the two members in the extended position. The lower rim 24 on the inner member 12 is also provided with apertures 66 which register with screws 62 so that when the inner and outer members are collapsed, the screws 62 can be advanced in the nuts 60 to engage the apertures 66 and thus hold the telescoping members in the collapsed position.

When the device is used as a minnow trap, the members 10 and 12 are extended as shown in Fig. 2 and locked in this position by the screws. The device is laid horizontally in the water with corn meal or other minnow bait within it and the discs 50 are pivoted to a position exposing openings 48. In reaching the bait, the minnows swim through the openings 48 and are, in effect, trapped.

The device can also be used for storing minnows over the side of a boat, such as illustrated in Fig. 5. When used in this manner, the discs 50 are preferably swung to a position closing the openings 48 and the minnows are accessible by opening the cover 26.

In some instances, it is desired to keep the minnows within the boat or to transfer them from one point to another. Under such circumstances, the members 10 and 12 are collapsed and the screws 62 are threaded into the nuts 60 to engage the indentations 66 in the rim 24 at the lower end of the inner member 12. A bucket 68 is provided for keeping the minnows in this manner.

Bucket 68 is formed of imperforate sheet metal with a side wall and a bottom wall. The bucket is open at its upper end. The bucket has a diameter slightly less than the diameter of the inner member 12; and when arranged within the inner member 12, it rests upon the bottom wall 22. Thus, the bucket 68 can be partially filled with water, inserted in the inner member 12 and stocked with minnows. In this condition of the device, the minnows are accessible by simply retracting the latch bolt 38 and opening the cover 26.

In the form of device shown in Fig. 10, the outer member 10 is constructed identically with the outer member 10 of the previously described embodiment of the invention. However, the inner member is formed as a bucket 70 with an imperforate side wall and a bottom wall 72 provided with a central opening 74 adapted to be closed by a cover 76 having a gasket 78 thereon for forming a water-tight seal around opening 74. A latch member 80 is utilized for holding the cover 76 in the closed, sealed position. The rim 82 at the lower end of the bucket is provided with the two holes 64 for optional engagement with the wing screws 62 for retaining the inner and outer tubular members in the collapsed position. The upper end of the bucket 70 is also provided with diametrical openings 64, not illustrated, with which the wing screws 62 are engageable to hold the inner and outer tubular members in the expanded position illustrated.

In the position illustrated in Fig. 10, the device is usable as a minnow trap in the same manner as described above with respect to the previous embodiment of the device. When it is desired to use the device as a minnow bucket alone, the inner and outer members are telescoped and the wing screws 62 engage with the lower set of openings 64. When used as a bucket as distinguished from a minnow trap, the cover 76 on the bottom wall of bucket 70 is closed so that the bucket will retain water.

I claim:

1. A minnow trap which is also usable as a minnow bucket comprising a pair of inner and outer tubular members formed of a foraminous material, said members being generally of equal length and arranged in telescoping relation so that they can be extended to a maximum length equal to approximately twice the length of either member and collapsed to a minimum length of one of the members, one member having its outer end closed by a bottom wall and its opposite end open, the other member having a hinged cover closing the outer end thereof and forming a top wall for the trap, said last mentioned member having its opposite end open, means for locking the members in fully extended position wherein the open ends are adjacent one another and for locking them in collapsed position wherein the open end of each member is adjacent the closed end of the other member, said bottom wall and said hinged cover being generally of the same diameter whereby when the cover is open, the outer end of said other member is open across substantially its entire diameter, a container arranged within said tubular members, said container having a diameter only slightly less than the inner member and having a length corresponding generally to the length of said members when collapsed and whereby said container substantially fills the volume of said members when collapsed and can be removed therefrom through the outer end of the member provided with the hinged cover, said container having imperforate bottom and side walls, said bottom wall of said one member and said hinged cover each having a minnow inlet opening therein, each of which is only sufficient to permit ingress of minnows, said inlet opening having a diameter which is only a very small fraction of the diameter of said members.

2. A minnow trap as called for in claim 1 including means forming closure members for optionally closing said inlet openings.

References Cited in the file of this patent

UNITED STATES PATENTS

| | | |
|---|---|---|
| 750,632 | Fisher | Jan. 26, 1904 |
| 933,216 | Wilson | Sept. 7, 1909 |
| 1,288,393 | Di Sante | Dec. 17, 1918 |
| 1,426,211 | Pausin | Aug. 15, 1922 |
| 1,495,594 | Hutchins | May 27, 1924 |
| 1,528,465 | Burbank et al. | Mar. 3, 1925 |
| 2,259,814 | Green et al. | Oct. 21, 1941 |
| 2,272,561 | Hubbell | Feb. 10, 1942 |
| 2,550,533 | Clark | Apr. 24, 1951 |